United States Patent
Wei et al.

(10) Patent No.: US 10,175,707 B1
(45) Date of Patent: Jan. 8, 2019

(54) VOLTAGE REGULATOR HAVING FEEDBACK PATH

(71) Applicant: Silicon Laboratories Inc., Austin, TX (US)

(72) Inventors: Li Wei, Oslo (NO); Steffen Skaug, Oslo (NO)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 15/626,425

(22) Filed: Jun. 19, 2017

(51) Int. Cl.
    *G05F 1/575* (2006.01)
    *H02M 3/158* (2006.01)
    *H02M 1/00* (2006.01)

(52) U.S. Cl.
    CPC ............ *G05F 1/575* (2013.01); *H02M 3/158* (2013.01); *H02M 2001/0025* (2013.01)

(58) Field of Classification Search
    CPC .................................. G05F 1/561; G05F 1/575
    USPC ................ 323/268, 274, 280, 284, 312–316; 361/18
    See application file for complete search history.

(56) References Cited

U.S. PATENT DOCUMENTS

| | | | |
|---|---|---|---|
| 9,342,084 B1 | 5/2016 | Konecny et al. | |
| 2008/0265854 A1* | 10/2008 | Lee | G05F 1/575 323/280 |
| 2015/0015222 A1* | 1/2015 | Ivanov | G05F 1/56 323/273 |
| 2015/0220096 A1* | 8/2015 | Luff | G02F 1/1368 327/109 |
| 2015/0355653 A1* | 12/2015 | Drebinger | G05F 1/575 323/280 |
| 2016/0147239 A1* | 5/2016 | Yan | G05F 1/575 323/280 |
| 2017/0093399 A1 | 3/2017 | Atkinson et al. | |

* cited by examiner

*Primary Examiner* — Gary Nash
(74) *Attorney, Agent, or Firm* — Trop, Pruner & Hu, P.C.

(57) ABSTRACT

In an example, an apparatus includes: a pass device coupled between a supply voltage node and a load circuit and to provide a regulated voltage to the load circuit in response to a control signal received at a control terminal of the pass device; a first amplifier to compare a reference voltage to the regulated voltage and to output a comparison signal at a comparison node in response to the comparison; a second amplifier having an input device having a control terminal coupled to the comparison node to receive the comparison signal and to output the control signal to the pass device based at least in part in response to the comparison signal; and a feedback circuit to provide a feedback signal to the first amplifier based at least in part on a load current of the load circuit.

18 Claims, 8 Drawing Sheets

VOLTAGE REGULATOR HAVING FEEDBACK PATH

BACKGROUND

Electronic systems typically employ voltage regulators for purposes of generating supply voltages for the various components of the system. One type of voltage regulator is a DC-to-DC switching converter, which typically regulates its output voltage by selectively activating and deactivating switches to energize and de-energize one or more energy storage components of the switching regulator. Another type of voltage regulator is a linear regulator, which typically regulates its output voltage by controlling a difference between the output voltage and the regulator's input voltage. More specifically, a typical linear regulator includes an amplifier to control and output current of a pass transistor of the regulator for purposes of regulating the output voltage.

SUMMARY OF THE INVENTION

In one aspect, an apparatus includes: a pass device coupled between a supply voltage node and a load circuit and to provide a regulated voltage to the load circuit in response to a control signal received at a control terminal of the pass device; a first amplifier to compare a reference voltage to the regulated voltage and to output a comparison signal at a comparison node in response to the comparison; a second amplifier having an input device having a control terminal coupled to the comparison node to receive the comparison signal and to output the control signal to the pass device based at least in part in response to the comparison signal; and a feedback circuit to provide a feedback signal to the first amplifier based at least in part on a load current of the load circuit.

In an embodiment, the feedback circuit comprises: a first resistor coupled between the supply voltage node and a feedback node that is to provide the feedback signal to the first amplifier; and a first metal oxide semiconductor field effect transistor (MOSFET) having a second terminal coupled to the feedback node and a first terminal coupled to a reference voltage node. The first amplifier may include: a first transconductor pair to receive the reference voltage and the regulated voltage and to output the comparison signal; and a first current mirror coupled to the first transconductor pair, the first current mirror having asymmetrically coupled inputs. The first current mirror may include a second MOSFET having a first terminal coupled to the supply voltage node and a third MOSFET having a first terminal coupled to the feedback node.

The apparatus may further include a capacitor coupled in parallel with the second MOSFET. A dominant pole may be determined by the load circuit and a second pole dependent upon the load current of the load circuit. When the load current is less than a first level, the second pole is based on the capacitor and a transconductance of the load circuit at the comparison node, and when the load current exceeds a first level, the second pole is based on the capacitor and the first resistor.

In an embodiment, the second amplifier comprises: the input device having a first terminal coupled to the supply voltage node and a second terminal coupled to a second current mirror; and the second current mirror to output a mirrored current to a third current mirror, where the third current mirror comprises the pass device to provide the load current to the load circuit. The first transconductor pair may have commonly coupled first terminals coupled to a bias current source, where the bias current source comprises a fixed current source, and where a frequency of a second pole of the apparatus is dynamic in response to the load current of the load circuit.

In an embodiment, the feedback circuit comprises: a first resistor coupled between the supply voltage node and a feedback node that is to provide the feedback signal to the first amplifier; a second resistor coupled between another current mirror and the feedback node, the another current mirror coupled between the supply voltage node and the second resistor. In another embodiment, the feedback circuit comprises a variable resistance based at least in part on the load current of the load circuit.

In another aspect, a regulator comprises: a transconductance pair having inputs to receive an output voltage of the regulator and a reference voltage and to output a comparison signal in response to comparison of the reference voltage with the output voltage; a first current mirror coupled to an output of the transconductance pair, where the first current mirror has asymmetrically coupled inputs, including a first input to receive a feedback signal from a feedback circuit; the feedback circuit to provide the feedback signal based at least in part on a load current of a load circuit coupled to the regulator; and a pass device to provide the output voltage in response to the comparison signal.

In an embodiment, the regulator further comprises a second amplifier to receive the comparison signal and to control the pass device based on the comparison signal. The second amplifier may comprise: an input device to receive the comparison signal; a second current mirror coupled to the input device to output a mirrored current in response to the comparison signal; and a third current mirror coupled to the second current mirror to provide another mirrored current to the pass device. The regulator may have a second pole that is dependent upon the load current of the load circuit, and where the second pole is to dynamically move in concert with a dominant pole determined by the load circuit.

In yet another aspect, an integrated circuit comprises: a first digital circuit to execute at least one digital function; a second digital circuit to execute at least a second digital function; a digitizer to receive and digitize incoming analog signals into digital signals and provide the digital signals to at least the first digital circuit; a first voltage regulator to provide a first regulated voltage to at least the first digital circuit; and a second voltage regulator to provide a second regulated voltage to at least the second digital circuit.

In an embodiment, the first voltage regulator comprises: a pass device coupled between a supply voltage node and the first digital circuit and to provide the first regulated voltage to the first digital circuit in response to a control signal received at a control terminal of the pass device; a first amplifier to compare a reference voltage to the first regulated voltage and to output a comparison signal at a comparison node in response to the comparison; and a feedback circuit comprising a variable resistance to provide a feedback signal to the first amplifier based at least in part on a load current of the first digital circuit.

In an embodiment, the integrated circuit is to switchably disable the second voltage regulator and the second digital circuit in a low power mode, the first voltage regulator to provide the first regulated voltage to the first digital circuit in the low power mode, to enable collection of the digital signals from the digitizer. The feedback circuit may include: a first resistor coupled between the supply voltage node and a feedback node that is to provide the feedback signal to the first amplifier; a current mirror coupled to the supply voltage node, the current mirror to mirror current into a second resistor; and the second resistor coupled between the current mirror and the feedback node, where the variable resistance comprises the first resistor and the second resistor.

DETAILED DESCRIPTION

In various embodiments, a voltage regulator is provided with a feedback mechanism to enable communication of feedback information regarding current consumption in a load circuit coupled to the voltage regulator. In this way, the feedback information identifies cases when the load current of the load circuit increases, so that one or more poles of the voltage regulator can dynamically move in frequency, to ensure stability of operation, even in high current consuming conditions of the load circuit. More specifically, both dominant and second poles can move in frequency, providing sufficient phase margin for the voltage regulator, while maintaining stability of operation, such that a substantially steady output voltage is maintained in light of varying conditions of the load circuit.

Figure 1:
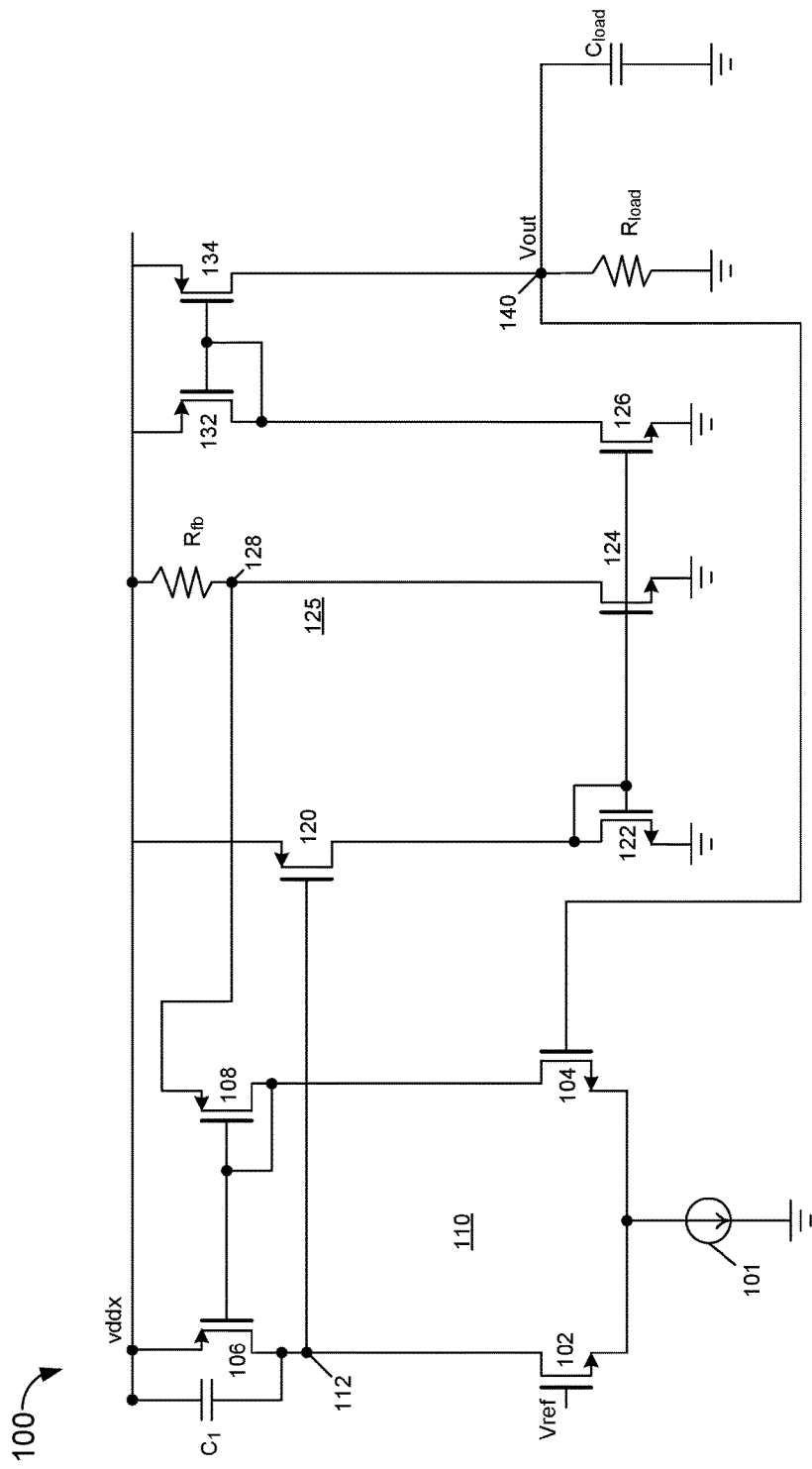
FIG. 1 is a schematic diagram of a voltage regulator in accordance with an embodiment.

Referring now to FIG. 1, shown is a schematic diagram of a voltage regulator in accordance with an embodiment. In the embodiment shown in FIG. 1, voltage regulator 100 is a low power, high load current low dropout (LDO) regulator. In general, regulator 100 operates by comparing a regulated output voltage (Vout) to a reference voltage (Vref) and adjusting the output voltage accordingly. Furthermore, this operation occurs with a given phase margin and in a manner that enables a dominant pole and a second pole to maintain sufficient spacing therebetween. To this end, regulator 100 includes internal feedback circuitry to enable this high order of stability even in situations where the voltage regulator is powering a load consuming a varying and high load current.

As illustrated in FIG. 1, regulator 100 includes a pass device 134 coupled between a supply voltage node (Vddx) (which may receive an input voltage to be regulated) and an output node 140 that couples to a load circuit (or more generally "load") and provides a regulated output voltage (Vout) to the load. By controlling the output current of pass device 134, this output voltage is regulated to a desired level. More specifically, pass device 134 is implemented in FIG. 1 as a P-channel metal oxide semiconductor field effect transistor (p-channel MOSFET, or PMOS) device 134. As seen, PMOS device 134 has a source terminal coupled to the supply voltage node and a drain terminal coupled to output node 140 (and a gate terminal commonly coupled with a gate terminal of another PMOS device 132, as described further below). This gate terminal of PMOS device 134 acts as a control terminal to control the current provided by way of pass device 134 to the load. In the embodiment shown, this load circuit is represented as a combined resistance and capacitance (respectively Rload and Cload). Note that this load circuit acts as the dominant pole for regulator 100.

To provide control of pass device 134, an error amplifier 110, which in an embodiment may include a transconductance amplifier formed of a differential transconductance pair, is configured to compare the voltage output (Vout) by regulator 100 to a reference voltage (Vref). To this end, error amplifier 110 includes a N-channel MOSFET (NMOS) device 102 having a gate terminal coupled to receive the reference voltage (Vref) and a NMOS device 104 having a gate terminal coupled to receive the output voltage (Vout). In an embodiment, Vref may be obtained from a reference voltage generator. As seen, NMOS device 102 and NMOS device 104 form a differential amplifier and have commonly coupled source terminals. As shown, these source terminals couple to a current source 101 that provides a bias current (Ibias). In the embodiment of FIG. 1, current source 101 may be a fixed source, regardless of load current, to reduce power consumption. NMOS device 102 has a drain terminal that provides the output of the error amplifier as a comparison signal at a comparison node 112 to a PMOS device 120 (coupled to node Vx). In the embodiment of FIG. 1, NMOS devices 102, 104 that form the differential amplifier may have the same dimensions.

As further illustrated, error amplifier 110 also includes a first current mirror formed of PMOS devices 106 and 108. PMOS devices 106, 108 of the first current mirror may have the same dimensions. PMOS devices 106, 108 have commonly coupled gate terminals. In turn, PMOS device 106 has a source terminal coupled to the supply voltage node and a drain terminal commonly coupled with the drain terminal of NMOS device 102. In turn, PMOS device 108 has a drain terminal coupled to the drain terminal of NMOS device 104 and further commonly coupled with its own gate terminal to realize the current mirroring. Note further that instead of having its source terminal coupled to the supply voltage node (as with PMOS device 106), PMOS device 108 has its source terminal coupled to receive an output of a feedback circuit 125, details of which are described further below. In this way, error amplifier 110 is configured to receive a feedback voltage signal from feedback circuit 125. Also note that with the configuration in FIG. 1, this first current mirror formed of PMOS devices 106, 108 does not have commonly coupled source terminals. Instead, the source terminal of PMOS device 106 couples to the supply voltage node, while the source terminal of PMOS device 108 is coupled to receive the feedback voltage signal. By way of these asymmetrically coupled source terminals, improved stability is realized.

Note that a second pole of regulator 100 is formed by way of an unwanted parasitic capacitance C1, coupled in parallel between the supply voltage node and the drain terminal of PMOS device 106.

In the embodiment of FIG. 1, PMOS device 120 has a control terminal to receive the comparison signal output by error amplifier 110. PMOS device 120 acts as an input to another amplifier stage. This amplifier stage includes NMOS devices 122, 126 and PMOS devices 120, 132. As seen PMOS device 120 has a source terminal coupled to the supply voltage node and a drain terminal coupled to NMOS device 122 (more specifically to a drain terminal of NMOS device 122). NMOS device 122 forms a second current mirror with another NMOS device 126 with which it has a commonly coupled gate terminal. As such, NMOS device 122 has commonly coupled drain and gate terminals.

As further illustrated, the gate terminals of NMOS devices 122, 126 commonly couple with a gate terminal of another NMOS device 124 of feedback circuit 125. In the illustration shown, feedback circuit 125 is formed of NMOS device 124 and a resistor $R_{fb}$, which couples between the supply voltage node and a feedback node 128 coupled also to the drain terminal of NMOS device 124. In an embodiment, NMOS devices 122, 124 and 126 all may have the same channel length and widths that vary according to a ratio of $W_{122}:W_{124}:W_{126}=1:Y_0:Y_1$. Feedback node 128 of feedback circuit 125 couples to the source terminal of PMOS device 108 to provide a feedback voltage to dynamically control operation of error amplifier 110, as well as dynamically controlling a location of the second pole based on the load current.

Finally with further reference to FIG. 1, another (e.g., third) current mirror is formed between pass device 134 and PMOS device 132 with which it has a commonly coupled gate terminal. As illustrated, PMOS device 132 has a source terminal coupled to the supply voltage node and a drain terminal coupled to the drain terminal of NMOS device 126 (and commonly coupled with its own gate terminal). PMOS devices 132, 134 may have the same channel length and widths that vary according to a ratio of: $W_{132}:W_{134}=1:K$.

With the arrangement of FIG. 1, the second pole is controllable dependent upon the load current. As such, as load current dynamically varies during operation, the frequency of the second pole also dynamically moves. In this way, as the dominant pole determined by the load circuit (Rload and Cload) moves to a higher frequency when load current increases, greater stability and dynamic load regulation response results, as the second pole moves in frequency in concert with the dominant pole.

More specifically, by inclusion of feedback circuit 125, the second pole becomes a function of the transconductance of PMOS device 120. When the load current increases, the transconductance of PMOS device 120 also increases, causing the second pole to move to a higher frequency. In this way, sufficient spacing is maintained between the dominant pole and the second pole to realize an acceptable level of phase margin and thus acceptable dynamic load regulation performance. Still further, this dynamic moving of the second pole occurs without increasing internal bias currents, such as current source 101, resulting in low power operation of regulator 100 when the load current is low (generally in the nanoampere to microampere level).

Still with reference to FIG. 1, operation occurs such that as the reference voltage exceeds the output voltage, the voltage at output node 112 of error amplifier 110 decreases. This voltage decrease in turn causes the current flowing through PMOS device 120 to increase, in turn increasing the current flowing through PMOS devices 132, 134. As such, this increased current flowing through pass device 134 causes an increase in the output voltage, thus regulating the output voltage to the reference voltage.

For purposes of discussion, the various NMOS and PMOS devices of FIG. 1 also may be referred to as Mn or Mp devices, in accordance with Table 1, which associates a given device enumerated in FIG. 1 with a M-based enumeration.

TABLE 1

| |
| --- |
| NMOS device 102 = $M_{n0}$ |
| NMOS device 104 = $M_{n1}$ |
| PMOS device 106 = $M_{p0}$ |
| PMOS device 108 = $M_{p1}$ |
| PMOS device 120 = $M_{p2}$ |
| NMOS device 122 = $M_{n2}$ |
| NMOS device 124 = $M_{n3}$ |
| NMOS device 126 = $M_{n4}$ |
| PMOS device 132 = $M_{p3}$ |
| PMOS device 134 = $M_{p4}$ |

In this architecture of FIG. 1, when the load current is relatively low (e.g., less than a level of approximately 10 microamperes (uA)), the second pole is determined by capacitor C1 and the load transconductance (gds). Instead when load current increases, e.g., above this given level, the second pole is determined by capacitor C1 and $gm(M_{p2})$ *$gm(M_{p1})$*$Y0$*$R_{fb}$. In this case when the load current increases, the second pole moves to a higher frequency, providing acceptable spacing between the two poles.

Regulator 100 may provide for good static load regulation performance, as any systematic offset introduced by resistor $R_{fb}$ may be on the order of millivolts (mV). Still further regulator 100 provides for low power consumption, such that when the load current is on the order of hundreds of nanoamperes (nA's) or several microamperes, the main power consumption is the input bias current, which may be below 50 nanoamperes. At the same time, the maximum load current regulator 100 can output with millivolt regulation error between reference voltage and output voltage is at a level of milliamperes (mA's). Furthermore with this arrangement, a less complex regulator is realized, as there are no complex digital control logics or large devices to realize the feedback mechanisms and dynamic pole control.

Figure 2:
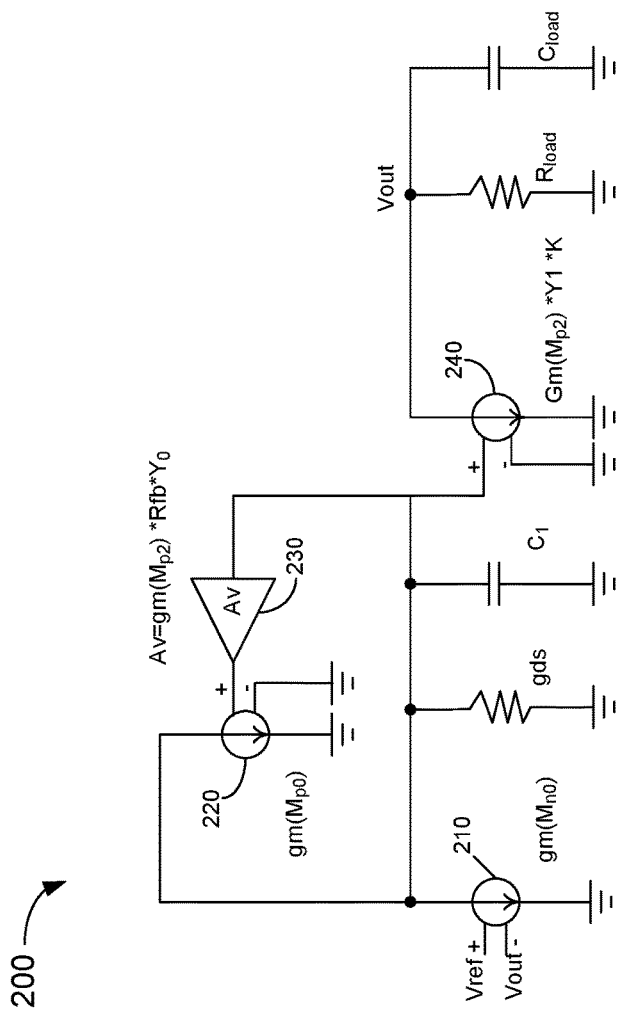
FIG. 2 is a schematic diagram of a small signal model of a voltage regulator in accordance with an embodiment.

Referring now to FIG. 2, shown is a schematic diagram of a small signal model of a voltage regulator in accordance with an embodiment. As shown in FIG. 2, small signal model 200 includes a current source 210 representing the transconductance (gm) of NMOS device $M_{n0}$ corresponding to the difference of the reference voltage and the output voltage output at comparison node 112, which is further shown as coupled to capacitor C1 and a load transconductance (gds) at this comparison node.

As further illustrated, this comparison node (which corresponds to the output of error amplifier 110 of FIG. 1) is provided to an amplifier 230 having an output coupled to another current source 220 (represented by the transconductance of PMOS device $M_{p0}$). As also illustrated, the comparison node couples to yet another current source 240 represented as: $gm(M_{p2})$*$Y_1$*$K$. As seen, current source 240 is coupled to the output voltage node Vout to which the load is coupled.

Figure 3:
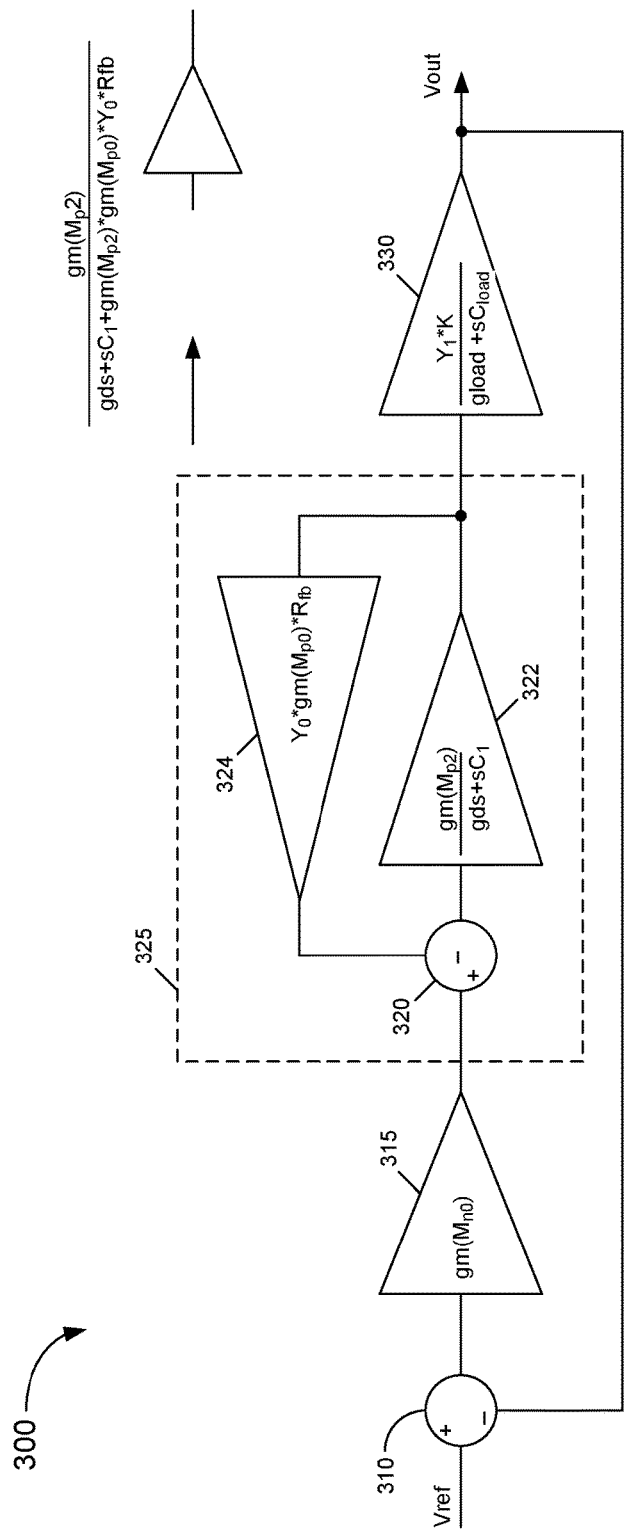
FIG. 3 is a signal flow diagram of a voltage regulator in accordance with an embodiment.

Referring now to FIG. 3, shown is a signal flow diagram of a voltage regulator in accordance with an embodiment. More specifically, signal flow diagram 300 illustrates a signal flow of regulator 100. As seen, a first summing node 310 is configured to compare the reference voltage Vref to the regulated output voltage Vout. This comparison value is amplified in a first amplifier stage 315 (having a gain of the transconductance of NMOS device $M_{n0}$). The output of amplifier stage 315 is coupled to another summing node 320 having an output coupled to another amplifier stage 322 (having a gain of $[gm(M_{p2})]/[gds+sC1]$). Note that a feedback amplifier stage 324, which represents the feedback circuit of the regulator, has a gain represented by $Y_0 \times gm(M_{p0}) \times R_{fb}$, and in turn is coupled to an inverting input of summing node 320. Note further that the circuit implementation within block 325 corresponds to:

$$\frac{gm(M_{p2})}{gds + sC_1 + gm(M_{p2})*gm(M_{p0})*Y_0*R_{fb}}.$$

The second pole of the circuit is determined by: $gds+sC_1+gm(M_{p2})*gm(M_{p0})*Y_0*R_{fb}$. When the load current is low (e.g., nA-uA level), this expression is approximated to $gds+sC_1$. When the load current is high (e.g., 100 uA to mAs), $gm(M_{p0})$ will increase and this expression is approximated to $sC_1+gm(M_{p2})*gm(M_{p0})*Y_0*R_{fb}$. Hence, the second pole increases when load current increases. The output of amplifier stage 322 is provided to another amplifier stage 330, represented as having a gain of $[Y_1 \times K/(gload+sCload)]$, to provide the output voltage. Understand while shown at this high level in the embodiment of FIG. 3, many variations and alternatives are possible.

Figure 4:
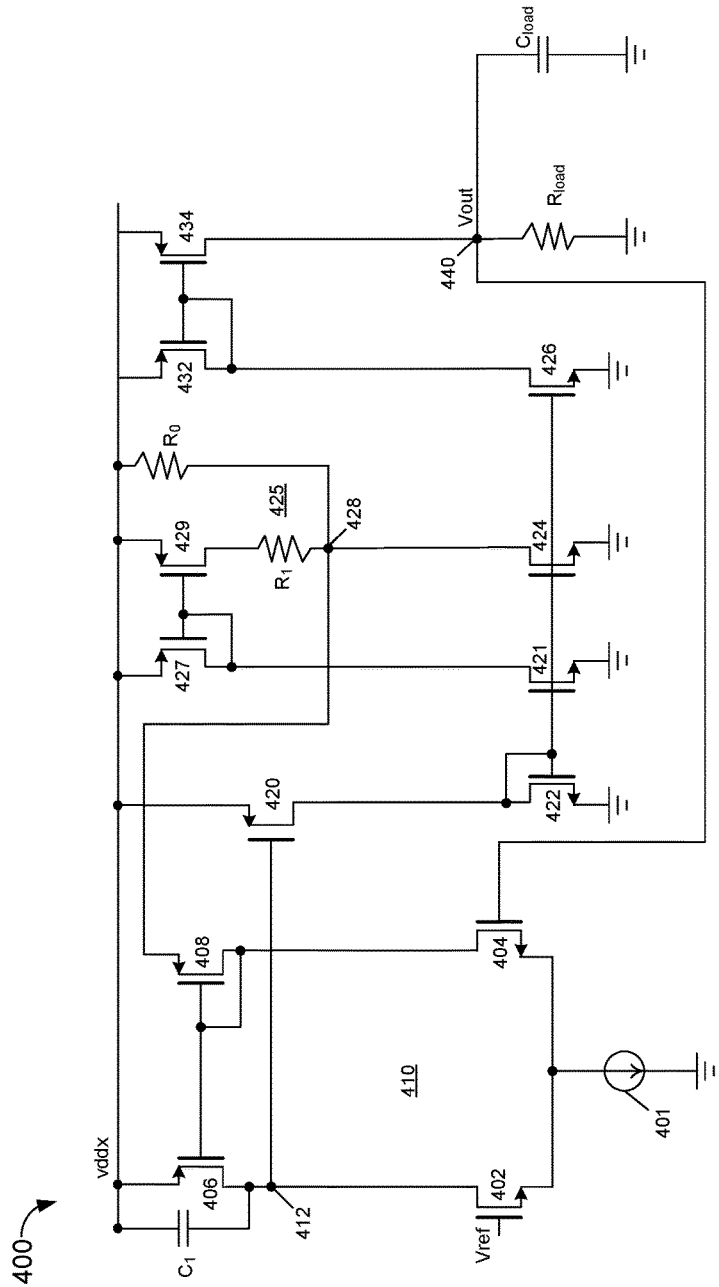
FIG. 4 is a schematic diagram of a voltage regulator in accordance with another embodiment.

Referring now to FIG. 4, shown is a schematic diagram of a voltage regulator in accordance with another embodiment. As illustrated in FIG. 4, voltage regulator 400 may generally be similarly adapted as voltage regulator 100 of FIG. 1. That is, voltage regulator 400 includes a pass device, a first amplifier stage, a second amplifier stage, and a feedback circuit. However, the feedback circuit in FIG. 4 is arranged differently than the feedback circuit of FIG. 1. This is the case, as with an embodiment as in FIG. 1, the fixed resistance ($R_{fb}$) present in feedback circuit 125 remains constant, regardless of load current. As such, while a high level of phase margin is possible with this architecture (and in many cases far exceeding a required phase margin), at high load currents, voltage regulation can become impaired. In some cases, with a fixed resistance, feedback circuit 125 of FIG. 1 may introduce undesired systematic offset between the reference voltage and output voltage, namely static load regulation performance at very high load currents. At the same time, the architecture of voltage regulator 100 may overcompensate its phase margin, which may be unneeded in many applications.

To improve regulation performance, in the embodiment of FIG. 4, a controllable resistance is provided within feedback circuit 425. As illustrated in FIG. 4, voltage regulator 400 generally includes the same architecture as in FIG. 1. As such, commonly enumerated devices (of the 400 series, instead of the 100 series of FIG. 1) are not further discussed. Of note in FIG. 4, a different feedback circuit 425 is provided. Specifically, instead of a single, fixed resistor ($R_{fb}$) and a corresponding NMOS device 124, a controllable resistance is realized. As seen, feedback device 425 includes multiple resistors R0 and R1, a current mirror formed of PMOS devices 427 and 429 and NMOS devices 421, 424. More specifically as illustrated in FIG. 4, feedback circuit 425 includes a first resistor (R0) coupled between the supply voltage node and feedback node 428, and a second resistor (R1) coupled between feedback node 428 and a drain terminal of PMOS device 429. In turn, PMOS device 429 has a source terminal coupled to the supply voltage node and a gate terminal commonly coupled with the gate terminal of PMOS device 427. In turn, PMOS device 427 has a source terminal coupled to the supply voltage node and a drain terminal coupled to a drain terminal of NMOS device 421 (and has its gate and drain terminals commonly coupled, to provide current mirroring). As further illustrated NMOS devices 421, 422 have their gate terminals commonly coupled with NMOS devices 422, 426, and source terminals coupled to a reference voltage node.

With this configuration, feedback circuit 425 provides a variable resistance according to: $1/gds(M_{P6})$ (where $M_{P6}$ is PMOS device 429). In this configuration, PMOS device 429 operates in the triode region. In embodiments, the value of R0 may be much higher than the value of R1. In one particular example, R0 may be approximately 20 kiloOhms (kOhms) and R1 may be approximately 0.5 kOhms, or about a 50× difference.

With feedback circuit 425, when load current is at a relatively low level (e.g., nA-uA level) the source terminal of PMOS device 408 is equivalent to be coupled to R0 only at feedback node 428, as at this level of operation, PMOS device 429 is almost off. Instead when load current is at a medium or high level (e.g., greater than tens of uA's), PMOS device 429 operates in the triode region and the source terminal of PMOS device 408 is equivalent to be connected with $1/gds(M_{P6})$. Instead when load current exceeds a supported operating region (e.g., greater than approximately 50 mA), the source terminal of PMOS device 408 is equivalent to be coupled to R1 at feedback node 428, for high stability.

Figure 5:
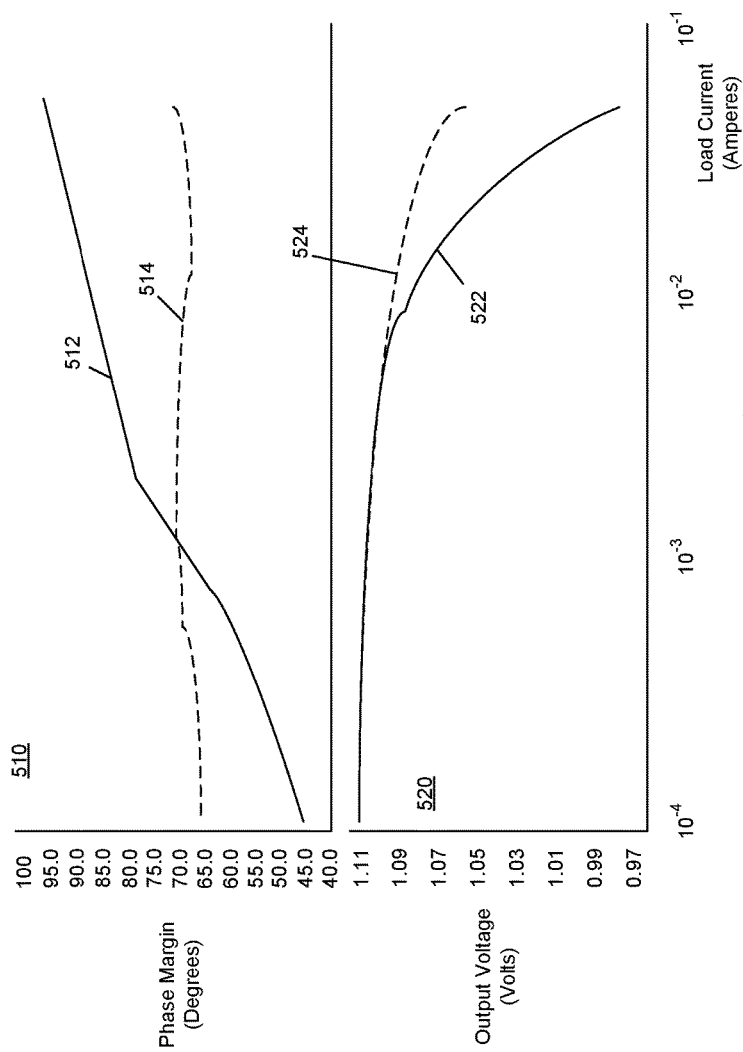
FIG. 5 is a graphical illustration of comparisons of phase margin and load regulation for the voltage regulators of FIGS. 1 and 4.

Referring now to FIG. 5, shown is a graphical illustration of comparisons of phase margin and load regulation for the voltage regulators of FIGS. 1 and 4, respectively, according to a simulation. As illustrated in FIG. 5, a phase margin diagram 510 displays phase margin performance as a function of load current for the architecture of FIG. 1 (via curve 512) and for the architecture of FIG. 4 (curve 514). As illustrated, voltage regulator 400 provides for a more stable phase margin across load currents (albeit at a lower phase margin level). More specifically as illustrated, the phase margin of curve 514 is substantially stable around approximately 65° of phase margin. In contrast, the phase margin of curve 512 varies over load current. However, as typical systems may be specified for acceptable phase margin levels of 60°-65°, the architecture of voltage regulator 400 may provide acceptable phase margin performance.

Referring now to voltage regulation diagram 520, regulation performance as a function of load current is illustrated. As seen, curve 522 displays regulation performance for the architecture of voltage regulator 100 of FIG. 1. While acceptable regulation performance is realized across varying load currents, at high load currents, less stable regulation performance occurs. Instead as shown in curve 524, voltage regulator 400 of FIG. 4 has a more stable regulation performance even at high load currents. Thus both architectures provide sufficient phase margin to achieve excellent dynamic load regulation performance, with the architecture of voltage regulator 400 achieving greater static load regulation performance.

Figure 6:
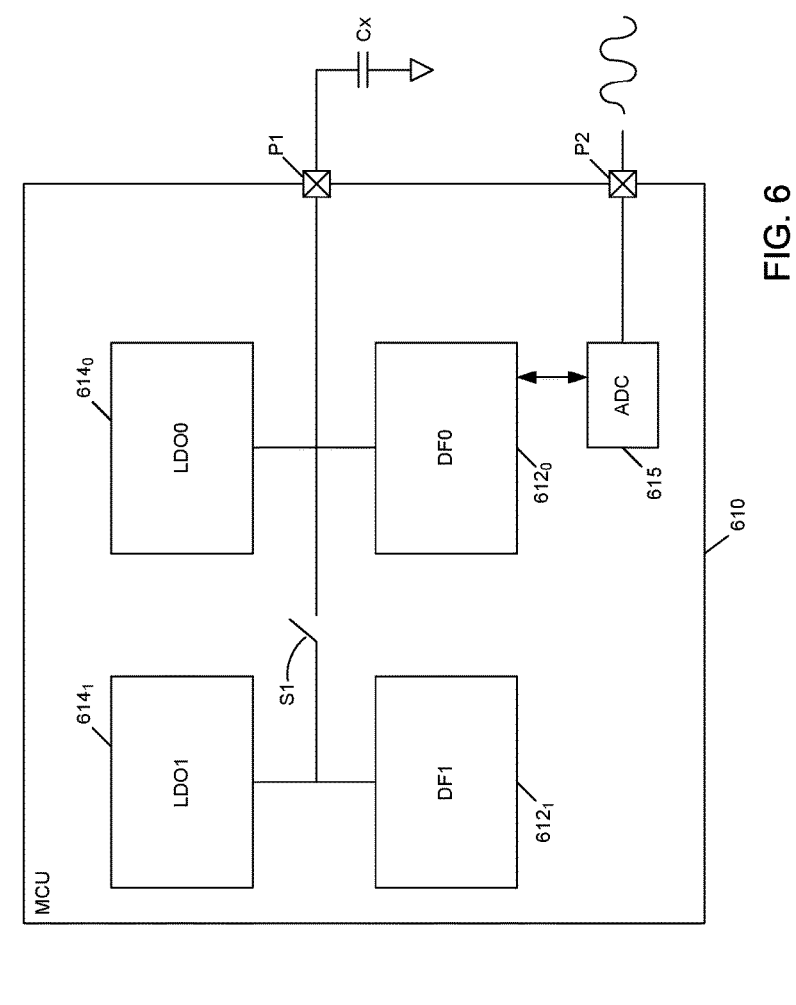
FIG. 6 is a block diagram of a system in accordance with an embodiment.

Referring now to FIG. 6, shown is a block diagram of a system in accordance with an embodiment of the present invention. More specifically, system 600 may be any type of low power system, such as may be used to sense information (e.g., from one or more real-sensors), process the sensed information, and communicate it to another portion of system 600.

As illustrated in FIG. 6, system 600 includes a microcontroller unit (MCU) 610, also referred to as a microcontroller. In an embodiment, MCU 610 may be implemented as an IC within a given package. As illustrated, via pins P1 and P2, MCU 610 couples to a capacitance ($C_X$) and further couples to an input signal line, via which it may receive incoming sensed information from one or more sensors (e.g., analog sensing information from a variety of different types of sensors).

In turn, MCU 610 includes multiple digital processing circuits (namely digital circuits $612_0$-$612_1$). Note while for ease of illustration only two digital circuits are shown, in many embodiments many more digital circuits may be present. In different embodiments, digital circuits 612 may be implemented as processing cores, specialized processing units or so forth. In the embodiment shown, digital circuit $612_0$ is coupled to receive incoming digitized information from a digitizer 615, which may be implemented as an analog-to-digital converter (ADC). More specifically, ADC 615 may digitize incoming analog sensed information and provide it to digital circuit $612_0$.

As further illustrated, digital circuits 612 may be powered by one or more voltage regulators. As seen, a first voltage regulator $614_0$ and a second voltage regulator $614_1$ are present. In embodiments, each of these voltage regulators may be configured for operation at different power levels. As an example, voltage regulator $614_0$ may implement an embodiment herein such that it can operate at low current levels (e.g., a maximum load current of less than approximately 5 milliamperes). In turn, voltage regulator $614_1$ may operate at higher load currents (e.g., exceeding 50 milliamperes). As seen, voltage regulator $614_1$ can be selectively enabled to be in operation, e.g., by way of a switch S1.

Many integrated circuits include millions of logic gates integrated in one or more chips. To drive all of them at one time, more than 50 mA current may be needed. A regulator to drive this high current consumption consumes uA level current during standby mode. To support low power applications and increase battery life, MCU 610 divides digital functionalities into different parts by different energy modes. In high energy mode, digital functionalities included in digital circuits $612_{0,1}$ are enabled and voltage regulator $614_1$ is enabled to support high load current. However, in a low energy mode, only digital circuit $612_0$ is enabled and voltage regulator $614_0$ is enabled to drive its digital functionality. In this low energy mode case, the maximum load current may only be several mA and the minimum load current is tens of nA, which means voltage regulator $614_0$ having nA level current consumption during standby mode can significantly improve battery life.

As a real world application example, ADC 615 samples one or more external signals (via coupling to one or more sensors), e.g., at a predetermined frequency. As such, current consumption in low energy mode is uA level when ADC 615 is sampling and nA level when ADC 615 is off. After hundreds/thousands of cycles of data collections, the digital functionality of digital circuit $612_1$ may be enabled for a short period to process data. In this way, battery life can increase in low energy mode.

Figure 7:
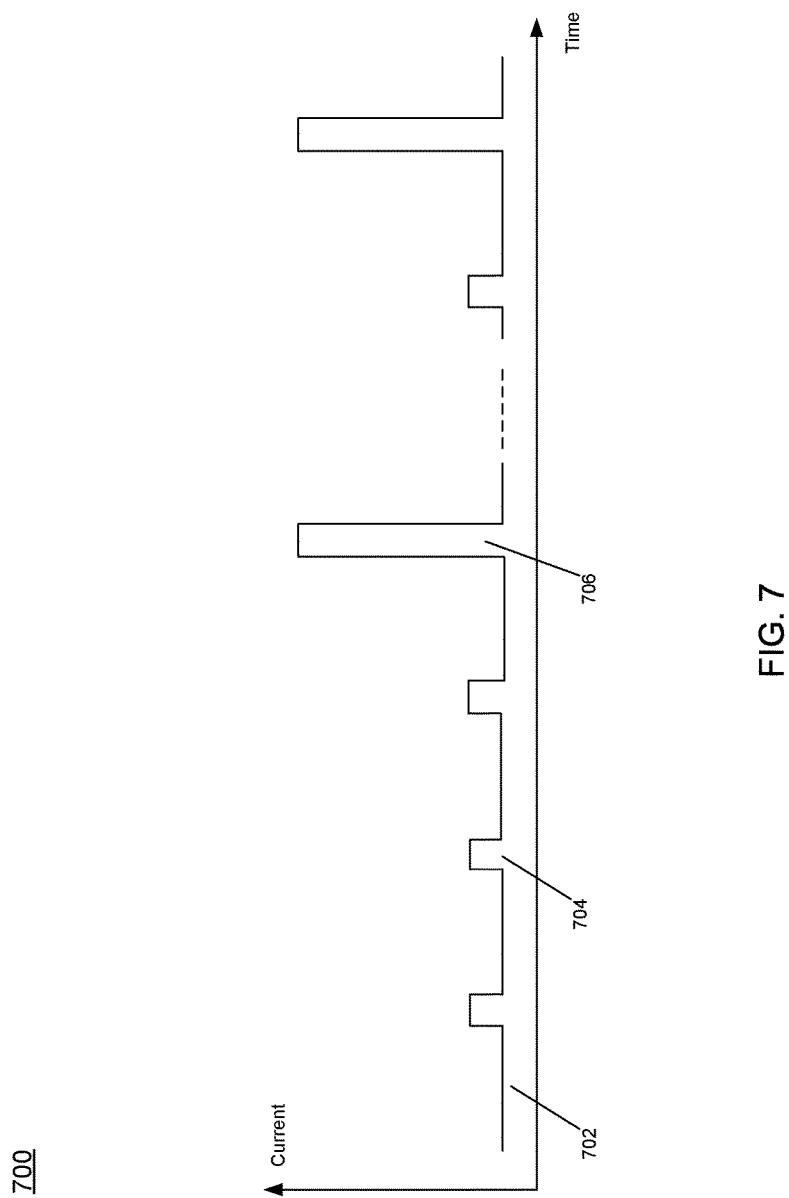
FIG. 7 is a graphical illustration of current consumption over time for an integrated circuit in accordance with an embodiment.

Referring now to FIG. 7, shown is a graphical illustration of current consumption over time for an integrated circuit in accordance with an embodiment. As seen in FIG. 7, illustration 700 shows that current consumption of an integrated circuit (such as MCU 610 of FIG. 6) varies over time. In a low energy mode, e.g., illustrated at time instant 702, the integrated circuit operates in a low energy mode, e.g., with its ADC powered off. In this case, IC current consumption may be relatively low (e.g., between approximately 10 nA-100 nA). Instead as seen at time instant 704, also in the low energy mode, the ADC (e.g., ADC 615), may be powered on. As such, current consumption increases to a level of some amount of microamperes. For both time instants 702 and 704, a voltage regulator in accordance with an embodiment may provide sufficient load current capabilities to power the integrated circuit. Instead, when a high power mode is active, as illustrated at time instance 706, the low energy mode is disabled. This operation may occur, e.g., when additional digital circuitry (such as digital circuit $612_1$) is powered on. In this case, the load current consumption may be on the order of approximately 100 uA-100 mA. To this end, a higher power voltage regulator (such as voltage regulator $614_1$) may be powered on. Understand while shown with this particular implementation in FIG. 7, many other examples are possible.

Figure 8:
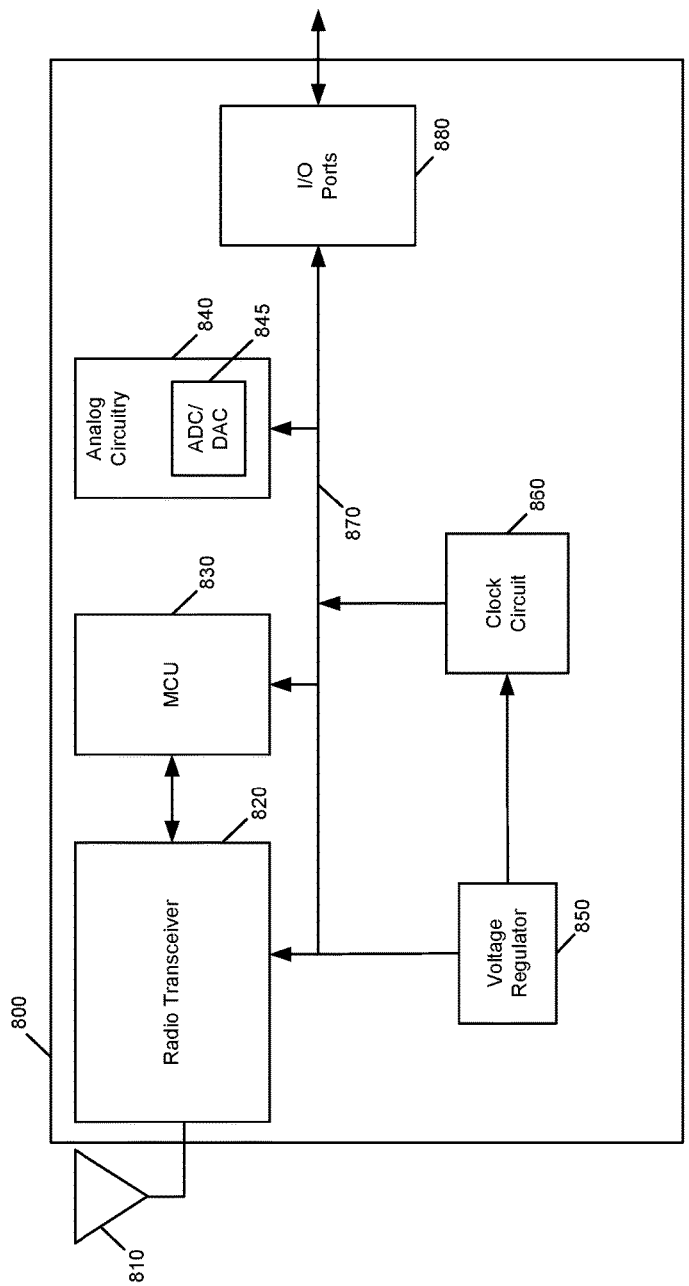
FIG. 8 is a block diagram of an integrated circuit in accordance with an embodiment.

Referring now to FIG. 8, shown is a block diagram of an integrated circuit in accordance with an embodiment. As shown in FIG. 8, integrated circuit 800 may take the form of a microcontroller or other such circuit. As seen, integrated circuit 800 is coupled to an antenna 810, which may provide for transmission and receipt of radio frequency (RF) signals of one or more bands (or in some cases multiple such antennas may be present).

In turn, antenna 810 couples to a radio transceiver 820 which may include one or more signal processing paths to process incoming and outgoing RF signals of the one or more bands. In turn, radio transceiver 820 communicates with an MCU 830, which may include the main processing and control circuitry of the integrated circuit. MCU 830 communicates with additional circuitry, including analog circuitry 840, which may act as an interface to various analog components such as a variety of different off-chip sensors that may couple to integrated circuit 800 via a set of I/O ports 880. In the embodiment shown, analog circuitry 840 includes an analog-to-digital/digital-to-analog circuitry (ADC/DAC) 845 to digitize incoming analog signals received from such off-chip sources and to convert to analog form digital information, such as control information to be communicated to off-chip sources. A set of interconnects 870 may couple the various components of the integrated circuit, to provide communication of power, clock and data signals.

Still with reference to FIG. 8, voltage regulator 850 provides regulated voltages to various components of integrated circuit 800. More specifically, voltage regulator 850 may be a low power high load current LDO regulator as described herein. Understand while only a single voltage regulator 850 is shown for ease of illustration, in many cases a given MCU or other IC may include multiple voltage regulators (such as discussed above with regard to FIG. 6) that may be selectively enabled/disabled based on load current consumption. Stated another way, different voltage regulators optimized for different current consumption levels can be powered on and off as needed. Understand while shown at this high level in the illustration of FIG. 8, many variations and alternatives are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a pass device coupled between a supply voltage node and a load circuit and to provide a regulated voltage to the load circuit in response to a control signal received at a control terminal of the pass device;
   a first amplifier to compare a reference voltage to the regulated voltage and to output a comparison signal at a comparison node in response to the comparison;

a second amplifier having an input device having a control terminal coupled to the comparison node to receive the comparison signal and to output the control signal to the pass device based at least in part in response to the comparison signal; and
a feedback circuit to provide a feedback signal to the first amplifier based at least in part on a load current of the load circuit, wherein the feedback circuit comprises:
a first resistor coupled between the supply voltage node and a feedback node that is to provide the feedback signal to the first amplifier; and
a first metal oxide semiconductor field effect transistor (MOSFET) having a second terminal coupled to the feedback node and a first terminal coupled to a reference voltage node.

2. The apparatus of claim 1, wherein the first amplifier comprises:
a first transconductor pair to receive the reference voltage and the regulated voltage and to output the comparison signal; and
a first current mirror coupled to the first transconductor pair, the first current mirror having asymmetrically coupled inputs.

3. The apparatus of claim 2, wherein the first current mirror comprises:
a second MOSFET having a first terminal coupled to the supply voltage node; and
a third MOSFET having a first terminal coupled to the feedback node.

4. The apparatus of claim 3, further comprising a capacitor coupled in parallel with the second MOSFET.

5. The apparatus of claim 4, wherein the apparatus comprises a dominant pole determined by the load circuit and a second pole dependent upon the load current of the load circuit.

6. The apparatus of claim 5, wherein when the load current is less than a first level, the second pole is based on the capacitor and a transconductance of the load circuit at the comparison node.

7. The apparatus of claim 5, wherein when the load current exceeds a first level, the second pole is based on the capacitor and the first resistor.

8. The apparatus of claim 2, wherein the second amplifier comprises:
the input device having a first terminal coupled to the supply voltage node and a second terminal coupled to a second current mirror; and
the second current mirror to output a mirrored current to a third current mirror, wherein the third current mirror comprises the pass device to provide the load current to the load circuit.

9. The apparatus of claim 2, wherein the first transconductor pair has commonly coupled first terminals coupled to a bias current source.

10. The apparatus of claim 9, wherein the bias current source comprises a fixed current source, and wherein a frequency of a second pole of the apparatus is dynamic in response to the load current of the load circuit.

11. The apparatus of claim 1, wherein the feedback circuit further comprises:
a second resistor coupled between another current mirror and the feedback node; and
the another current mirror coupled between the supply voltage node and the second resistor.

12. The apparatus of claim 1, wherein the feedback circuit comprises a variable resistance based at least in part on the load current of the load circuit.

13. A regulator comprising:
a transconductance pair having inputs to receive an output voltage of the regulator and a reference voltage and to output a comparison signal in response to comparison of the reference voltage with the output voltage;
a first current mirror coupled to an output of the transconductance pair, wherein the first current mirror has asymmetrically coupled inputs, including a first input to receive a feedback signal from a feedback circuit;
the feedback circuit to provide the feedback signal based at least in part on a load current of a load circuit coupled to the regulator; and
a pass device to provide the output voltage in response to the comparison signal.

14. The regulator of claim 13, further comprising a second amplifier to receive the comparison signal and to control the pass device based on the comparison signal.

15. The regulator of claim 14, wherein the second amplifier comprises:
an input device to receive the comparison signal;
a second current mirror coupled to the input device to output a mirrored current in response to the comparison signal; and
a third current mirror coupled to the second current mirror to provide another mirrored current to the pass device.

16. The regulator of claim 13, wherein the regulator has a second pole that is dependent upon the load current of the load circuit, and wherein the second pole is to dynamically move in concert with a dominant pole determined by the load circuit.

17. An integrated circuit comprising:
a first digital circuit to execute at least one digital function;
a second digital circuit to execute at least a second digital function;
a digitizer to receive and digitize incoming analog signals into digital signals, and provide the digital signals to at least the first digital circuit;
a first voltage regulator to provide a first regulated voltage to at least the first digital circuit, the first voltage regulator comprising:
a pass device coupled between a supply voltage node and the first digital circuit and to provide the first regulated voltage to the first digital circuit in response to a control signal received at a control terminal of the pass device;
a first amplifier to compare a reference voltage to the first regulated voltage and to output a comparison signal at a comparison node in response to the comparison; and
a feedback circuit comprising a variable resistance to provide a feedback signal to the first amplifier based at least in part on a load current of the first digital circuit; and
a second voltage regulator to provide a second regulated voltage to at least the second digital circuit, wherein the integrated circuit is to switchably disable the second voltage regulator and the second digital circuit in a low power mode, the first voltage regulator to provide the first regulated voltage to the first digital circuit in the low power mode, to enable collection of the digital signals from the digitizer.

18. The integrated circuit of claim 17, wherein the feedback circuit comprises:
a first resistor coupled between the supply voltage node and a feedback node that is to provide the feedback signal to the first amplifier;

a current mirror coupled to the supply voltage node, the current mirror to mirror current into a second resistor; and the second resistor coupled between the current mirror and the feedback node, wherein the variable resistance comprises the first resistor and the second resistor.

* * * * *